(12) United States Patent
Danz et al.

(10) Patent No.: US 6,597,977 B1
(45) Date of Patent: Jul. 22, 2003

(54) METHOD FOR ADJUSTING THE RATIO OF TRANSMISSION IN A CONTINUOUS VARIABLE TRANSMISSION

(75) Inventors: Wolfgang Danz, Friedrichshafen (DE); Andreas Piepenbrink, Meersburg (DE); Andreas Schwenger, Friedrichshafen (DE)

(73) Assignee: ZF Batavia L.L.C., Batavia, OH (US)

( * ) Notice: Subject to any disclaimer, the term of this patent is extended or adjusted under 35 U.S.C. 154(b) by 0 days.

(21) Appl. No.: 09/831,095

(22) PCT Filed: Nov. 3, 1999

(86) PCT No.: PCT/EP99/08424

§ 371 (c)(1),
(2), (4) Date: May 3, 2001

(87) PCT Pub. No.: WO00/28241

PCT Pub. Date: May 18, 2000

(30) Foreign Application Priority Data

Nov. 6, 1998 (DE) .......................................... 198 51 110

(51) Int. Cl.[7] .......................... G06F 17/00; B60K 41/14
(52) U.S. Cl. .......................................... 701/51; 477/31
(58) Field of Search ............................... 701/51, 54–56, 701/58–61; 477/7, 15, 17, 31, 34, 43, 36–37, 44, 46, 49, 156, 158, 161–164; 474/237

(56) References Cited

U.S. PATENT DOCUMENTS 5,168,778 A * 12/1992 Todd et al. ................ 474/18
5,259,272 A * 11/1993 Yamamoto et al. ........... 477/45
5,967,918 A   10/1999 Knapp et al. ................. 474/28

FOREIGN PATENT DOCUMENTS

| DE | 33 10 786 A1 | 9/1984 | |
| DE | 44 11 939 A1 | 10/1995 | |
| DE | 43 12 745 C2 | 5/1996 | |
| DE | 196 06 311 A1 | 8/1997 | |
| DE | 196 32 747 A1 | 2/1998 | |
| EP | 0 061 733 A2 | 10/1982 | |
| EP | 0 634 590 A1 | 1/1995 | |
| EP | 0 760 441 A2 | 3/1997 | |
| JP | 11-16365 | 9/1989 | F16H/11/06 |

* cited by examiner

*Primary Examiner*—Thu Nguyen
(74) *Attorney, Agent, or Firm*—Davis & Bujold, P.L.L.C.

(57) ABSTRACT

Within the scope of the method for adjusting the ratio value for a continuously variable transmission having a variator, a minimum contact pressure force $P_{1,min}$, and/or $P_{2,min}$ is continuously calculated for the two variator discs on the basis of the actual ratio and of the actual torque to be transmitted and according to the calculated contact pressure minimum force the primary or the secondary disc is determined as controlled variable to be used for the variator ratio, the controlled variable being determined by a comparison of the required pressure values $P_{1,soll}$ or $P_{2,soll}$ with the calculated contact-pressure minimum value in a manner such that if $P_{1,soll} \leq P_{1,min}$, the controlled variable changes from the primary to the secondary side and if the condition $P_{2,soll} \leq P_{2,min}$ is fulfilled, the secondary side changes to the primary side, the primary side being the controlled variable at the start of the method.

9 Claims, 2 Drawing Sheets

METHOD FOR ADJUSTING THE RATIO OF TRANSMISSION IN A CONTINUOUS VARIABLE TRANSMISSION

FIELD OF THE INVENTION

According to the preamble of claim 1, this invention relates to a method for adjusting the transmission ratio for a continuously variable transmission of a motor vehicle.

BACKGROUND OF THE INVENTION

A continuously variable transmission according to the continuously variable principle (CVT transmission) usually consists, among other things, of a starting unit, a forward/reverse drive unit, an intermediate shaft, a differential, hydraulic and electronic control devices and a variator. The variator usually comprises a primary and a secondary pulleys also called primary and secondary sides wherein both pulleys are formed by cones disposed in pairs and are provided with a torque-transmitting continuously variable element which rotates between the two cone pairs. In such a transmission, the actual ratio is defined by the moving radius of the continuously variable element which, in turn, is a function of the axial position of the bevel discs.

Consequently, during a change of ratio, depending on the construction, the cone pairs of primary and secondary pulleys of the variator are alternatively and complementarily separated from each other and joined with each other, via corresponding control elements, which produces a change of the moving radius of the continuously variable element upon the bevel discs and thus a change of the ratio between primary and secondary sides.

In the prior art, the variator was mostly functionally divided between the primary side for control of the ratio change (adjustment) and the secondary side for setting the necessary pressures (pressing), which ensures the required contact between the disc and the continuously variable element so that no slip results.

EP 0 634 590 A1 has disclosed a method and a hydraulic control for ratio adjustment of a continuously variable CVT in which the minimum contact pressure required, which is calculated from the actual ratio and the torque actually to be transmitted to the variator, is covered as needed either via the pressure on the secondary disc or via the pressure on the primary disc. The hydraulic control of the variator is designed as here -series connection of a secondary valve directly coupled with the oil pump and a primary valve, wherein the secondary pressure corresponds to the pump pressure and the primary pressure at no time can fall below the secondary pressure. In the operating states in which the primary disc determines the system pressure, the secondary pressure is correspondingly raised in order to ensure the minimum contact pressure required on the primary disc.

To prevent slip between the disc and the continuously variable element, the prior art teaches to apply great safety additions to the calculated control pressure values. This procedure has the disadvantage of impairing the efficiency of the automatic transmission.

Besides, due to the limitation of the controlled variable for introducing a ratio change on the primary side of the variator, the adjustment dynamics is significantly limited.

Controlled loop structures are usually employed such as described in the Applicant's DE 196 06 311 A1. Such control loop structures combine a linearization of the control system based on a physical-mathematical model by means of a correction member with a linear Proportional Integral Differential Regulator (PID controller). The controlled variable of the PID controller is interpreted as standard for the adjustment gradient to be set.

SUMMARY OF THE INVENTION

On the basis of the prior art, the problem on which this invention is based is to indicate a method for setting the, ratio value for a continuously variable transmission so as to obtain the best possible efficiency of the transmission utilizing at the same time all the degrees of freedom of the adjustment dynamics and simultaneously obtaining the best possible protection of the transmission.

The inventive method must adapt the control pressures of the primary and secondary sides of the variator to an operating point determined so that the control pressures do not fall below calculated minimum contact pressure values required for operation of the variator, thereby reducing to a minimum the effects of an overpressure that are relevant to the efficiency of the variator and protecting the variator from control pressures less than the required contact pressures.

Accordingly, it is proposed that the primary and secondary sides of the variator be regarded, in relation to the adjustment of hydraulic pressure on the variator disks, as being absolutely equal between both disks of the variator and to calculate the operating pressure for both discs, on the basis of the actual ratio and of the actual torque to be transmitted, a minimum contact pressure force pressing on the continuously variable element. It is also proposed to determine, according to the calculated contact pressure minimum force, the primary or, secondary disc as controlled variable to be used. According to the invention, this is determined by comparing the required pressure values with the calculated contact pressure minimum values.

The contact pressure minimum values (theoretical values) are calculated, according to the invention, on the basis of a physical-mathematical model.

BRIEF DESCRIPTION OF THE DRAWING(S)

The invention is explained in detail below with reference to the enclosed drawings which show:

DETAILED DESCRIPTION OF THE INVENTION

The first step of the inventive method consists in calculating the minimum contact pressure forces or contact pressure theoretical values for both variator sides. This is done with reference to the following equations;

$$P_1, \min = \frac{T_1 \cdot \cos(\alpha)}{2 \cdot \mu \cdot A_1 \cdot r_1} \cdot SF_1$$

-continued $$P_2, \min = \frac{T_1 \cdot \cos(\alpha)}{2 \cdot \mu \cdot A_1 \cdot r_{-12}} \cdot SF_2$$

with:

$P_1$,min: contact pressure minimum force primary side
$P_2$,min: contact pressure minimum force secondary side
$T_1$: input torque on the primary side of the variator
$A_1$: disc surface of the primary side
$A_2$: disc surface of the secondary side
$r_1$: actual moving radius primary side
$r_2$: actual moving radius secondary side
α: disc angle
μ: frictional value of the contact band-bevel disc
$SF_1$: safety factor of the primary side
$SF_2$ safety factor of the secondary side According to the invention, to each variator side is allotted its own separately settable safety factor. The actual moving radius ($r_1$, $r_2$) is calculated according to the stationary geometric equations. For optimizing the computation time, these equations are stored in the transmission control unit via characteristic lines or characteristic fields as function of the variator ratio (iv).

Figure 2:
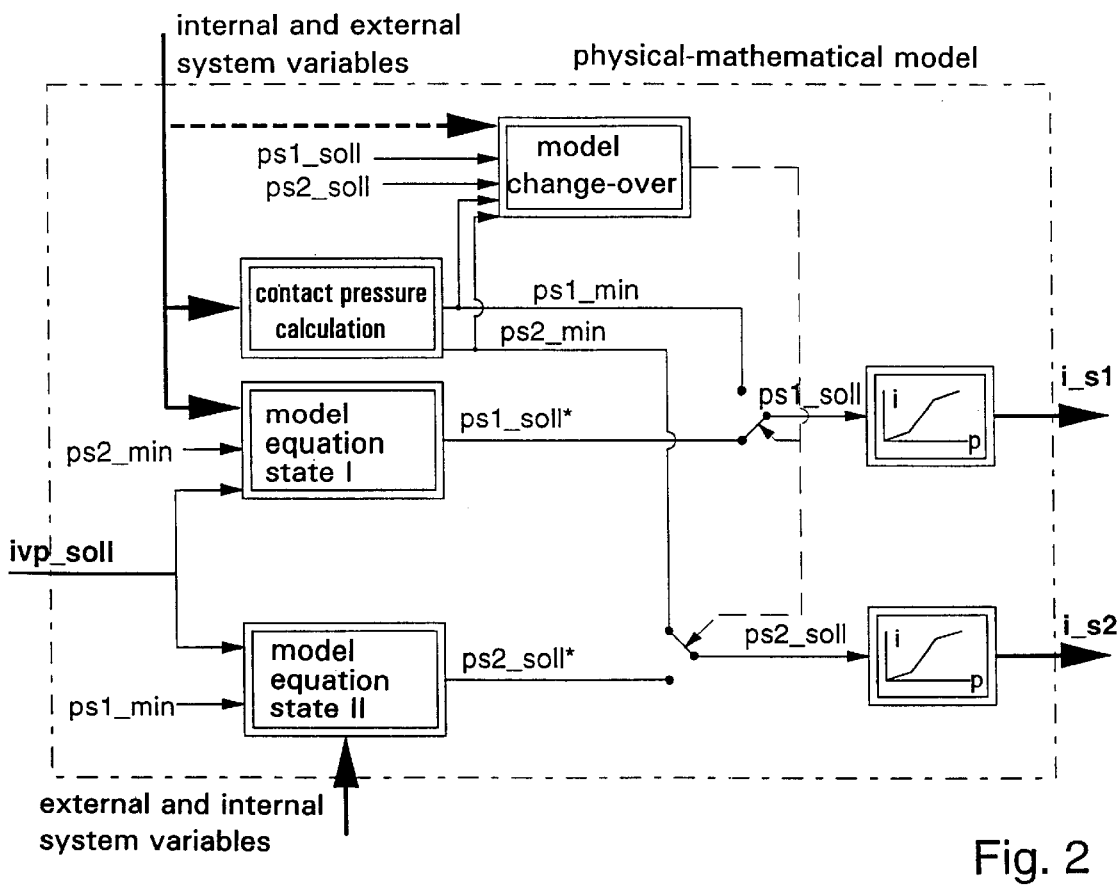
FIG. 2 is a block shift diagram representation of a section of the control loop structure for a band as continuously variable element according to a first variant of the invention.

The adjustment gradient (ratio change speed) dependent on the pressures (forces) introduced by the primary and secondary sides can be shown as physical-mathematical model equation as follows:

$$k(iv) \cdot \frac{d\,iv}{dt} = p_2 \cdot A_2 \cdot k_p k_s - p_1 \cdot A_1$$

with:

k(iv): ratio-dependent damping coefficient
div/dt: adjustment gradient (ratio gradient)
$p_1$: control pressure of the primary side
$p_2$: control pressure of the secondary side
$A_1$: disc surface of the primary side
$A_2$: disc surface of the secondary side
$k_p k_s$: adjustment force ratio In order to optimize the computation time, the damping coefficient and the adjusting force ratio acre, as indicated in FIG. 2, provided as either a stored characteristic line (k(iv)=(iv)) or as a stored characteristic field ($k_p k_s$=f(iv, 1/SF)), thereby allowing the values to be read from the stored values of the characteristic line or as the.value of the characteristic field rather than calculated.

By transposing the equation of the adjustment gradient, according to the contact pressures of the primary and secondary sides, there results the calculation rule that follows for setting the control pressure according to a required adjustment gradient value:

$$P_1, soll = \frac{1}{A_1}\left(\left(P_2, \min \cdot A_2 \cdot k_p k_s - k(iv) \cdot \frac{d\,iv}{dt}\bigg|\right)_{soll}\right) \text{ for } P_{2,soll} = P_{2,\min}$$

and correspondingly $$P_{2,soll} = \frac{1}{A_2 \cdot k_p k_s}\left(\left(k(iv) \cdot \frac{d\,iv}{dt}\bigg|\right)_{soll} + P_{1,\min} \cdot A_1\right) \text{ for } P_{1,soll} = P_{1,\min}.$$

The controlled variable (primary or secondary side) to be used for the actual adjustment requirement is determined according to the invention by comparing the required pressure values with the calculated contact pressure minimum values. The controlled variable of the adjustment regulation thus changes always to and fro between primary and secondary sides. Subject to principle continuous pressure transitions result without any pressure jump resulting in the change-over time.

Since the protection of the transmission has top priority, the maintenance of the necessary contact pressure minimum value is in the foreground. Consequently, there results a change in the controlled variable from the primary side to the secondary side when $P_{1,soll} \leq P_{1,min}$ applies. Accordingly, a change results in the state from the secondary to the primary side when the condition $P_{2,soll} \leq P_{2,min}$ is fulfilled. It is thus ensured that the minimum pressure value required be not fallen below.

Figure 1:
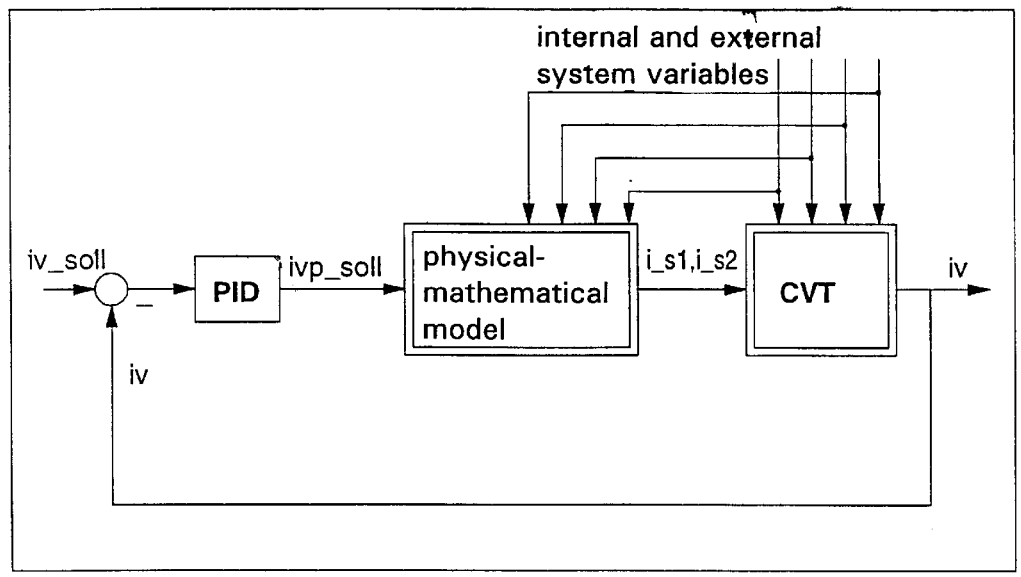
FIG. 1 is a block shift diagram representation of the general control loop structure according to this invention.

The above described calculation rules for the pressure values of primary and secondary sides of the variator are related or dependent upon the theoretical ratio iv_soll in a control loop from the prior art wherein the theoretical ratio iv_soll is a command variable and the calculation rules for the pressure values of the primary-and secondary sides of the variator are the pilot or primary controllers of the control loop, which is diagrammatically shown in FIG. 1.

According to FIG. 1 and according to the present invention, and from the point of view of automatic control technology, the model-based pressure calculation represents and is the "inverse model" of the real control system, that is, of the actual variator, and can thus be also used as a substitute for the real control system of the variator, as in the prior art, for linearization of the control system. The physical-mathematical model basis of this invention is implemented in the block "physical-mathematical model" shown in FIG. 1. Since the substitute control system resulting-from and represented by the inverse calculated model implemented in the block "physical-mathematical model" shown in FIG. 1 [taken into account] and the real control system of the variator both show a linear behavior, it is possible to compensate, with a simple linear controller, for any remaining model inaccuracies and dynamic interruptions.

The enclosed self-explanatory FIG. 2 diagrammatically shows a block shift diagram representation of the block "physical-mathematical model" of FIG. 1 according to a variant of the inventive method. The model equations are evaluated in parallel with reference to the adjustment gradient value for both discs in the, blocks "model equation state I" and "model equation, state II". Simultaneously, the contact pressure calculation is continuously carried out in the block "contact pressure calculation" and with reference to the above criteria changed over between the two states by means of the block "model change-over". At the start of the method, the primary side is the controlled variable.

Figure 3:
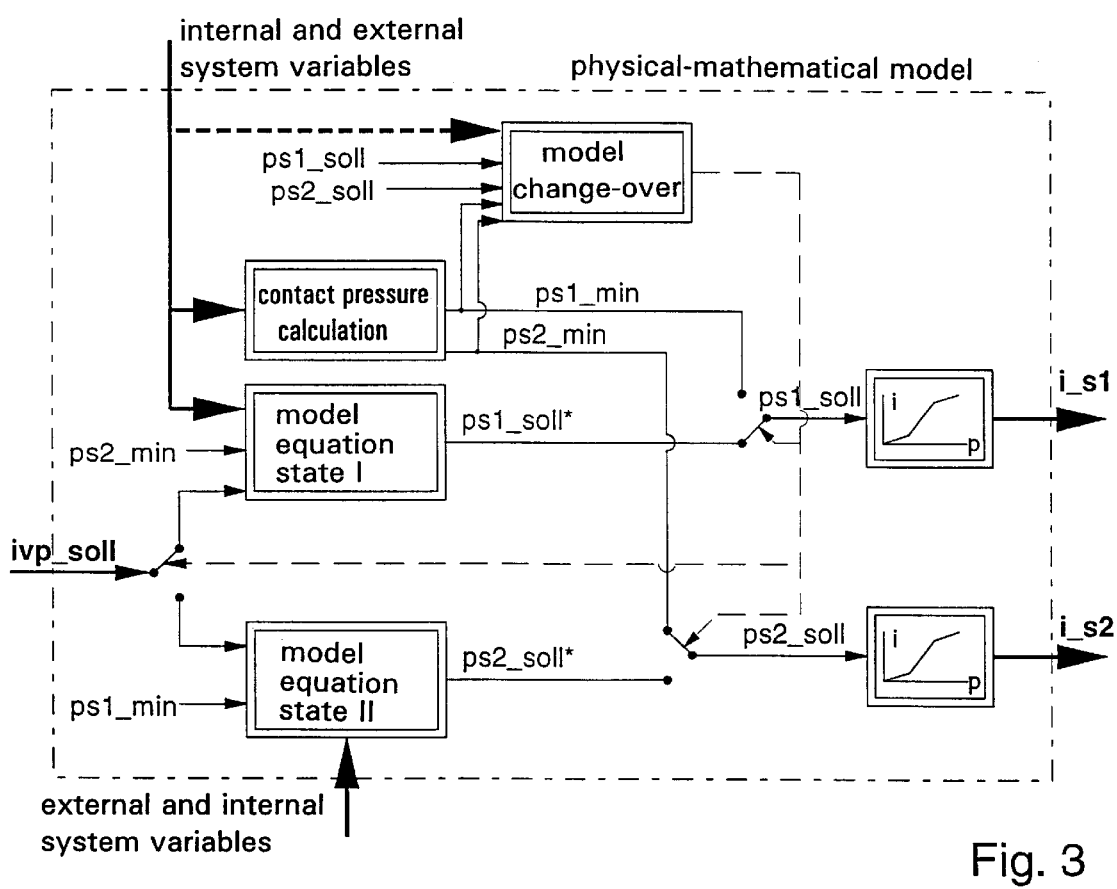
FIG. 3 is a block shift diagram representation of a section of the control loop structure for a band as continuously variable element according to a second variant of the invention.

However, within the scope of a variant shown in the self-explanatory FIG. 3, only the model, equation of the actual controlled variable is to be evaluated and not until detecting the need of a change of state by means of the block "model change over" accordingly changed over and the evaluation of the model equation for the other side carried out.

References $P_{1,min}$: contact pressure minimum force primary side,
$P_{2,min}$: contact pressure minimum force secondary side,
$T_1$: input torque on the primary side of the variator,
$A_1$: disc surface of the primary side,
$A_s$: disc surface of the secondary side, $r_1$: actual moving radius primary side,
$r_2$: actual moving radius secondary side,
α: disc angle,
μ: frictional value of the contact band-bevel disc,
$SF_1$: safety factor of the primary side,
$SF_2$: safety factor of the secondary side,
k(iv): ratio-dependent damping coefficient,
div/dt: adjustment gradient (ratio gradient),
$P_1$: control pressure of the primary side,
$P_2$: control pressure of the secondary side,
$k_p k_s$: adjustment force ratio,
iv: ratio.

The definition and meaning of terms appearing in FIGS. 1, 2 and 3 will be apparent from the above definitions and from definitions and discussions provided herein above. For example, the term PID is defined in standard industry usage as referring to a "proportional integral differential regulator. The terms "p" and "ps" refer to pressure values, "i" refers to an initial value, "iv" refers to a ratio, such as a variator ratio or a pressure ratio, "soll" refers to a selected or calculated nominal or theoretical value of a variable and "i_s" refers to a control pressure into a CVT or to signal controlling a control pressure in a CVT. "ivp_soll" thereby refers to an initial or input ratio or gradient of a nominal pressure, such as a control pressure exerting a force on a disk of a CVT, "i_s1" refers to an initial or input value of a pressure, "iv_soll" refers to a ratio or gradient of a nominal value or a nominal value of a ratio or gradient, and so on. The appending of a numeric designator such as 1 or 2 to a term differentiates between a first and a second value or representation of a variable. For example, "ip1_soll" refers to an initial first nominal control pressure while "ip2_soll" refers to an initial second nominal control pressure, and so on.

What is claimed is:

1. A method for adjusting the ratio value for a continuously variable transmission having one variator including a first variator disc and a second variator disc, comprising the steps of:

for the first and second variator discs and on the basis of an actual variator ratio and of a torque actually to be transmitted through the variator discs, continuously calculating minimum contact pressures $P_{1,min}$ and $P_{2,min}$ for a continuously variable element pressure and continuously calculating required control pressure values $P_{1,soll}$ and $P_{2,soll}$ for ratio adjustment of the variator, selecting one of a primary disc of a primary side of the variator or a secondary disc of a secondary side of the variator to be controlled by a control variable, wherein the control variable controls the selected variator disc through control of one of control pressure values $P_{1,soll}$ and $P_{2,soll}$ to determine a variator ratio according to an adjustment gradient value, by comparing the calculated minimum contact pressure forces $P_{1,min}$ and $P_{2,min}$, wherein the control variable is determined by comparing the required pressure values $P_{1,soll}$ and $P_{2,soll}$ with the calculated minimum contact pressure force values $P_{1,min}$ and $P_{2,min}$ in a manner such that a change of state in the control variable from the primary side of the variator to the secondary side of the variator occurs when the condition $P_{1,soll} \leq P_{1,min}$ is fulfilled, and that a change of state from the secondary to the primary side occurs when a condition $P_{2,soll} \leq P_{2,min}$ is fulfilled, at the start of the method steps the primary side is the control variable and the required pressure value $P_{1,soll}$ for the primary disc is one of greater than and less than the required pressure value $P_{2,soll}$ for the secondary disc, and the adjustment gradient value of the variator according to the pressures introduced by the primary and secondary side is determine by a physical-mathematical equation as $$k(iv) \cdot \frac{div}{dt} = p_2 \cdot A_2 \cdot k_p k_s - p_1 \cdot A_1$$

wherein
k(iv): ratio dependent damping coefficient,
div/dt: adjustment gradient (ratio gradient),
$p_1$: control pressure of the primary side,
p2: control pressure of the secondary side,
$A_1$: disc surface of the primary side,
$A_2$: disc surface of the secondary side,
$k_p k_s$: adjustment force ratio between the control pressures of the primary and secondary sides of the variator, and wherein for the control pressures $P_{1,soll}$ and $P_{2,soll}$ according to a required adjustment gradient value div/dt:

$$P_{1,soll} = \frac{1}{A_1}\left(\left(P_{2,min} \cdot A_2 \cdot k_p k_s - k(iv) \cdot \frac{div}{dt}\Big|_{soll}\right)\right) \text{ for } P_{2,soll} = P_{2,min}$$

and $$P_{2,soll} = \frac{1}{A_2 \cdot k_p k_s}\left(\left(k(iv) \cdot \frac{div}{dt}\Big|_{soll}\right) + P_{1,min} \cdot A_1\right) \text{ for } P_{1,soll} = P_{1,min}.$$

apply.

2. The method according to claim 1, wherein a computation time for determining the damping coefficient (k(iv)) and the adjustment force ratio $k_p k_s$ between the control pressures of the primary and secondary sides of the variator is optimized by storing a characteristic line (k(iv)=f(iv)) and a characteristic field ($k_p k_s$=f(iv, 1/SF)), respectively.

3. A method for adjusting the ratio value for a continuously variable transmission having one variator including a &s primary variator disc and a secondary variator disc, comprising the steps of:

for the primary and secondary variator discs and on the basis of an actual variator ratio and of an torque actually to be transmitted through the variator discs, continuously calculating minimum contact pressures $P_{1,min}$ and $P_{2,min}$ for a continuously variable element pressure and continuously calculating required control pressure values $P_{1,soll}$ and $P_{2,soll}$ for ratio adjustment of the variator, selecting one of a the primary variator disc of the primary side of the variator or a the secondary variator disc of the secondary side of the variator to be controlled by a control variable, wherein the control variable controls the selected variator disc through control of one of control pressure values $P_{1,soll}$ and $P_{2,soll}$ to determine a variator ratio according to an adjustment gradient value, by comparing the calculated minimum contact pressure forces $P_{1,min}$ and $P_{2,min}$ wherein the control variable is determined by comparing the required pressure values $P_{1,soll}$ and $P_{2,soll}$ with the calculated minimum contact pressure forces $P_{1,min}$ and $P_{2,min}$ in a manner such that a change of state in the control variable from the primary side of the variator to the secondary side of the variator occurs when the condition $P_{1,soll} \leq P_{1,min}$ is fulfilled, and that a change of state from the secondary to the primary side occurs when a condition $P_{2,soll} \leq P_{2,soll}$ is fulfilled, wherein at the start of the method steps the primary side is the control variable and wherein the required pressure value $P_{1,soll}$ for the primary disc is one of greater than and less than the required pressure value $F_{2,soll}$ for the secondary disc.

4. The method according to claim 3, wherein the minimum contact pressures $P_{1,min}$ and $P_{2,min}$ are calculated on the basis of a physical-mathematical model.

5. The method according to claim 4, wherein the minimum contact pressures $P_{1,min}$ and $P_{2,min}$ are calculated on the basis of the following:

$$P_1, \min = \frac{T_1 \cdot \cos(\alpha)}{2 \cdot \mu \cdot A_1 \cdot r_1} \cdot SF_1$$

$$P_2, \min = \frac{T_1 \cdot \cos(\alpha)}{2 \cdot \mu \cdot A_1 \cdot r_{-12}} \cdot SF_2$$

with:

$P_{1,min}$: minimum contact pressure force primary side,
$P_{2,min}$: minimum contact pressure force secondary side,
$T_1$: input torque on the primary side of the variator,
$A_1$: disc surface of the primary side,
$A_2$: disc surface of the secondary side,
$r_1$: actual moving radius primary side,
$r_2$: actual moving radius secondary side,
$\alpha$: disc angle,
$\mu$: frictional value of the contact band-bevel disc,
$SF_1$: safety factor of the primary side,
$SF_2$ safety factor of the secondary side,
wherein to each variator side a separately settable safety factor ($SF_1$, $SF_2$) is allotted and the actual moving radii ($r_1$, $r_2$) are calculated for the primary and secondary sides of the variator.

6. The method according to claim 5, wherein for optimizing the computing time, the equations for calculating the minimum contact pressures forces are stored on a transmission control unit via characteristic fields as functions of the variator ratio (iv) as represented by the actual moving radius of the primary side and the actual moving radius of the secondary side and of the primary-side input torque T1.

7. The method according to claim 6, wherein the pressure values $P_{1,soll}$ and $P_{2,soll}$ are bound to a nominal variator ratio iv_soll by being a function dependent upon the nominal variator ratio iv_soll and wherein the nominal variator ratio iv_soll is a command variable and is a primary controller of a control loop for determining the pressure values $P_{1,soll}$ and $P_{2,soll}$ according to a required adjustment gradient value div/dt.

8. The method according to claim 3, wherein model equations for calculating the control pressure values P1_soll and P2_soll for both variator discs are evaluated in parallel.

9. The method according to claim 3, wherein only the actual controlled variable of the selected one of a primary disc of a primary side of the variator or a secondary disc of a secondary side of the variator is evaluated and that the evaluation for the other of the primary disc of the primary side the variator or the secondary disc of the secondary side of the variator is performed only upon detection of the need of a change of state.

* * * * *